(12) United States Patent
Kakkar et al.

(10) Patent No.: US 9,710,657 B1
(45) Date of Patent: Jul. 18, 2017

(54) METHODS, SYSTEMS, AND COMPUTER PROGRAM PRODUCTS FOR SECURE INPUT AND RECEPTION OF SENSITIVE USER DATA

(71) Applicant: Intuit Inc., Mountain View, CA (US)

(72) Inventors: Samir R. Kakkar, Bangalore (IN); Sunil Madhani, Mumbai (IN); Anu Sreepathy, Bangalore (IN); Mithun U. Shenoy, Bangalore (IN)

(73) Assignee: INTUIT INC., Mountain View, CA (US)

( * ) Notice: Subject to any disclaimer, the term of this patent is extended or adjusted under 35 U.S.C. 154(b) by 295 days.

(21) Appl. No.: 14/318,413

(22) Filed: Jun. 27, 2014

(51) Int. Cl.
*G06F 21/60* (2013.01)
(52) U.S. Cl.
CPC .................................. *G06F 21/60* (2013.01)
(58) Field of Classification Search
CPC ....................................................... G06F 21/60
USPC ............................................................ 726/26
See application file for complete search history.

(56) References Cited

PUBLICATIONS

LastPass Manual Mar. 13, 2013.*

* cited by examiner

*Primary Examiner* — Kambiz Zand
*Assistant Examiner* — Benjamin Kaplan
(74) *Attorney, Agent, or Firm* — Vista IP Law Group LLP

(57) ABSTRACT

A computer-implemented method for securely receiving user data includes a computer associating a marker with a sensitive data field in a form. The method also includes the computer using the marker to facilitate secure entry of user data corresponding to the sensitive data field. The method further includes the computer entering the user data in the sensitive data field in the form. The marker is configured to refer to the sensitive data field without revealing additional information regarding the sensitive data field.

40 Claims, 16 Drawing Sheets

FIG. 4B charles SCHWAB

Form 1099
with Account Summary
Retain for your Records

Tax Year 2007

Page 1
Date Prepared: January 24, 2008

Payer's Name and Address

CHARLES SCHWAB & CO., INC.
101 MONTGOMERY ST.
SAN FRANCISCO, CA 94104
Federal ID Number: 94-1737782

Recipient's Name and Address

JOHN QUINCY PUBLIC
123 SUNSET DR
ANYTOWN CA 12345

Taxpayer ID Number: 123-45-6789
Account Number: AB 1234-5678

452 Dividends and Distributions - 2007   Form 1099-DIV
Department of the Treasury Internal Revenue Service    Copy B for Recipient (OMB No. 1545-0110)

| Box | Description | Amount | Total |
|---|---|---|---|
| 1a | Total Ordinary Dividends | $ | $ 4,856.81 |
| 1b | Qualified Dividends | 2,979.91 | |
| 2a | Total Capital Gain Distributions (includes amount shown in boxes 2b, 2c and 2d) | | 13,827.13 |
| 2b | Unrecap. Sec. 1250 Gain | 0.00 | |
| 2c | Section 1202 Gain | 0.00 | |
| 2d | Collectibles (28%) Gain | 0.00 | |
| 3 | Nondividend Distributions | | 0.00 |
| 4 | Federal Income Tax Withheld | | 0.00 |
| 5 | Investment Expenses | | 0.00 |
| 6 | Foreign Tax Paid | | 19.74 |
| 8 | Cash Liquidation Distributions | | 0.00 |
| 9 | Noncash Liquidation Distributions | | 0.00 |

FIG. 5A

← 450 charles SCHWAB  
Form 1099  
with Account Summary  
Retain for your Records

Tax Year 2007  
Page 1  
Date Prepared: January 24, 2008

| Payer's Name and Address | Recipient's Name and Address |
|---|---|
| CHARLES SCHWAB & CO., INC.<br>101 MONTGOMERY ST.<br>SAN FRANCISCO, CA 94104<br>Federal ID Number: 94-1737782 | JOHN QUINCY PUBLIC<br>123 SUNSET DR<br>ANYTOWN CA 12349 |

Taxpayer ID Number: 123-45-6789  
Account Number: AB 1234-5678

418

452 Dividends and Distributions - 2007      Form 1099-DIV  
Department of the Treasury-Internal Revenue Service     Copy B for Recipient (OMB No. 1545-0110)

| Box | Description | Amount | Total |
|---|---|---|---|
| 1a | Total Ordinary Dividends    Alpha | $ | $ 4,856.81 |
|  | (Includes amount shown in box 1b) |  |  |
| 1b | Qualified Dividends | 2,979.91 |  |
| 2a | Total Capital Gain Distributions |  | 13,827.13 |
|  | (Includes amount shown in boxes 2b, 2c and 2d) |  |  |
| 2b | Unrecap. Sec. 1250 Gain | 0.00 |  |
| 2c | Section 1202 Gain | 0.00 |  |
| 2d | Collectibles (28%) Gain | 0.00 |  |
| 3 | Nondividend Distributions |  | 0.00 |
| 4 | Federal Income Tax Withheld |  | 0.00 |
| 5 | Investment Expenses |  | 0.00 |
| 6 | Foreign Tax Paid |  | 19.73 |
| 8 | Cash Liquidation Distributions |  | 0.00 |
| 9 | Noncash Liquidation Distributions |  | 0.00 |

FIG. 5B

J&J Office Cleaning
890 Winter St.
Waltham, MA 02451 kevin_furbish@intuit.com

510 ↙

Invoice

| Date | Invoice # |
|---|---|
| 10/05/2012 | 1030 |
| Terms | Due Date |
| Net 30 | 11/04/2012 |

Bill To
Mountain View Temporary Services
1234 Main St
Mountain View, CA 98765 USA

512 ↗

| Amount Due | Enclosed |
|---|---|
| $535.18 | |

*Please detach bottom portion and return with your payment.*

| Activity | Amount |
|---|---|
| • Cleaning solutions, trash bags, misc | 39.00T |
| • Weekly cleaning for October | 460.00T |
| | |
| SubTotal | $499.00 |
| Tax (7.25%) | $36.18 |
| Total | $535.18 |

METHODS, SYSTEMS, AND COMPUTER PROGRAM PRODUCTS FOR SECURE INPUT AND RECEPTION OF SENSITIVE USER DATA

SUMMARY

Embodiments are directed to a computer-implemented method for securely receiving user data. In one embodiment directed to a computer-implemented method for securely receiving user data, the method includes a computer associating a marker with a sensitive data field in a form. The method also includes the computer using the marker to facilitate secure entry of user data corresponding to the sensitive data field. The method further includes the computer entering the user data in the sensitive data field in the form. The marker is configured to refer to the sensitive data field without revealing additional information regarding the sensitive data field.

A further embodiment is also directed to a computer-implemented method for securely receiving user data. The method includes a computer associating a marker with a sensitive data category. The method also includes the computer using the marker to facilitate secure entry of user data corresponding to the sensitive data category. The marker is configured to refer to the sensitive data category without revealing additional information regarding the sensitive data category.

Another embodiment is directed to a computer-implemented method for securely entering user data into a form. The method includes a computer associating a marker with a sensitive data field in a form. The method also includes the computer receiving user confirmation of a marker—sensitive data field association. The method further includes the computer analyzing a user document to identify user data corresponding to the sensitive data field. Moreover, the method includes the computer receiving user confirmation of a user data—marker. In addition, the method includes the computer entering the user data in the sensitive data field in the form after receiving user confirmation of the marker—sensitive data field association and the user data—marker. The marker is configured to refer to the sensitive data field without revealing additional information regarding the sensitive data field.

Still another embodiment is directed to a computer-implemented method for securely receiving user data. The method includes a computer analyzing a previously completed form to identify sensitive user data. The method also includes the computer associating a marker with the identified sensitive user data, wherein the marker is configured to refer to the sensitive user data without revealing additional information regarding the sensitive data category. The method further includes the computer using the marker to facilitate secure entry of user data. The computer using the marker to facilitate secure entry of user data may also include the computer displaying the marker visually linked to the identified sensitive user data, the computer requesting user identification of sensitive user data, and the computer receiving user identification of sensitive user data.

In a single or multiple embodiments, the method may also include the computer identifying the sensitive data field in the form. The method may also include the computer associating the marker with the sensitive data field without user intervention to generate a marker—sensitive data field association. Alternatively, the method may also include the computer receiving user confirmation of the marker—sensitive data field association. The method may also include the computer receiving input identifying the sensitive data category before associating the marker therewith.

In a single or multiple embodiments, the method may include the computer analyzing the form to identify the sensitive data field therein. Further, the method may include the computer associating all sensitive data fields in a form with respective markers, where each marker is configured to refer to a respective sensitive data field without revealing additional information regarding the respective sensitive data field.

In a single or multiple embodiments, the method may also include the computer displaying a user interface configured to receive user confirmation of the marker—sensitive data field association. The method may also include the computer displaying a user interface configured to receive user confirmation of the user data—marker. The method may also include the computer displaying a user interface configured to receive the user data. The various user interfaces may include a graphical user interface and/or an audio user interface. The various user interfaces may also include a speech recognition interface and/or a gesture recognition interface.

Further embodiments are directed to articles of manufacture or computer program products comprising a non-transitory computer readable storage medium embodying one or more instructions executable by a computer to perform a process for securely receiving user data. One process includes a computer associating a marker with a sensitive data field in a form, the computer using the marker to facilitate secure entry of user data corresponding to the sensitive data field, and the computer entering the user data in the sensitive data field in the form, where the marker is configured to refer to the sensitive data field without revealing additional information regarding the sensitive data field.

Another process includes a computer associating a marker with a sensitive data category, and the computer using the marker to facilitate secure entry of user data corresponding to the sensitive data category, where the marker is configured to refer to the sensitive data category without revealing additional information regarding the sensitive data category.

Still another process is a process for securely entering user data into a form, and includes a computer associating a marker with a sensitive data field in a form, the computer receiving user confirmation of a marker—sensitive data field association, the computer analyzing a user document to identify user data corresponding to the sensitive data field, the computer receiving user confirmation of a user data—marker, and the computer entering the user data in the sensitive data field in the form after receiving user confirmation of the marker—sensitive data field association and the user data—marker, where the marker is configured to refer to the sensitive data field without revealing additional information regarding the sensitive data field.

BRIEF DESCRIPTION OF THE DRAWINGS

The foregoing and other aspects of embodiments are described in further detail with reference to the accompanying drawings, in which the same elements in different figures are referred to by common reference numerals, wherein:

FIG. 3A depicts an exemplary form that can be completed using various embodiments.

FIG. 3B depicts the form of FIG. 3A as displayed in a graphical user interface according to various embodiments.

FIG. 4A depicts an exemplary form that can be completed using various embodiments.

FIG. 4B depicts the form of FIG. 4A as displayed in a graphical user interface according to various embodiments.

FIG. 5A depicts an exemplary user document for use by various embodiments.

FIG. 5B depicts the form of FIG. 5A as displayed in a graphical user interface according to various embodiments.

FIG. 6A depicts an exemplary form that can be completed using various embodiments.

FIG. 6B depicts the form of FIG. 6A as displayed in a graphical user interface according to various embodiments.

FIG. 11A depicts an exemplary previously completed form including sensitive user data.

FIG. 11B depicts the form of FIG. 11A as displayed in a graphical user interface according to various embodiments.

Figure 1:
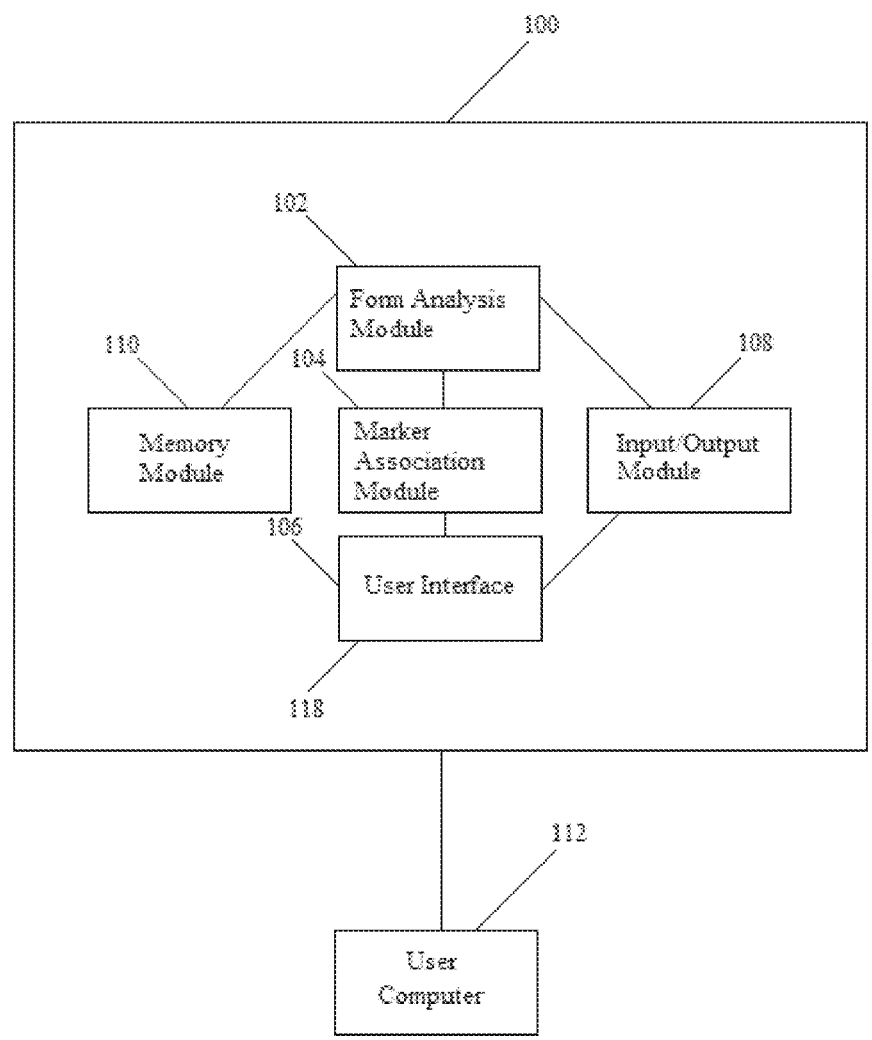
FIG. 1 is a block diagram of one embodiment of a system configured for secure user entry of sensitive data and secure reception of sensitive user data by a computer.

In order to better appreciate how to obtain the above-recited and other advantages and objects of various embodiments, a more detailed description of embodiments is provided with reference to the accompanying drawings. It should be noted that the drawings are not drawn to scale and that elements of similar structures or functions are represented by like reference numerals throughout. It will be understood that these drawings depict only certain illustrated embodiments and are not therefore to be considered limiting of scope of embodiments.

DETAILED DESCRIPTION OF ILLUSTRATED EMBODIMENTS

Embodiments are directed to populating an electronic document with data by use of a marker or reference associated with the data such that the data can be communicated more securely. For example, rather than a system asking a user "What is your Social Security number" during preparation of an electronic tax return with a tax return preparation program such as TURBOTAX tax return preparation program, the system 100 can receive a document or form, such as an electronic copy or version of a tax document, determine fields of the form, e.g., by use of optical character recognition, and identify or select fields that involve pre-determined types of data such as pre-determined types or categories of sensitive user data. The system associates a marker, reference or placeholder with the identified or selected fields so that when referring to a type or category of sensitive information (such as Social Security number), the system can instead refer to an assigned marker "Alpha." This allows the system to refer to sensitive data fields by referring to the markers while requesting user data entry, without revealing additional information regarding the sensitive data that is requested. Thus, for example, instead of asking the user "What is your Social Security number," the system 100 can ask the user "What is the value of Alpha?" to provide increased security and reduce or prevent malicious user data capture, thus providing a substantial improvement to existing data entry systems and processes.

Embodiments are particularly useful for entry of sensitive data. As used in this application, "sensitive data" includes, but is not limited to, information, the uncontrolled dissemination whereof would lead to negative consequences for the owner of the information. Such data includes identifying information (e.g., Social Security number) and financial information (e.g., total wages). Uncontrolled dissemination of such sensitive data can lead to identity theft.

As used in this application, "computer" includes, but is not limited to, a computer (laptop or desktop) and a computer or computing device of a mobile communication device, smartphone and tablet computing device such as an iPad®.

Referring to FIG. 1, a secure data entry system 100 constructed according to one embodiment includes or involves three operatively connected software modules, programs, or applications: (1) a form analysis module 102; (2) a marker association module 104; and (3) a user interface 106. System embodiments provide secure user entry of sensitive data and secure reception of sensitive user data by a computer. The system 100 also includes an input/output module 108 and a memory module 110 configured to communicate with the other software modules in the system 100.

The secure data entry system 100 can be integrated into a tax preparation system, such as TURBOTAX® or a financial management system, such as QUICKBOOKS® financial management system, or hosts thereof. TURBOTAX® and QUICKBOOKS® are available from Intuit Inc., Mountain View, Calif. TURBOTAX® and QUICKBOOKS® are registered trademarks of Intuit Inc. Alternatively, the secure data entry system 100 may be a separate program connected to a tax preparation system or a financial management system via a network.

In the embodiment depicted in FIG. 1, the form analysis module 102, marker association module 104 and user interface 106 run on a user computer 112, which is a personal computer, such as a desktop or laptop computer. Alternatively, the user computer 112 may be a mobile communication or computing device such as a smartphone or a tablet computing device. On a smartphone or a tablet computing device, the secure data entry system 100 may be part of an application, or "app." In other embodiments, the secure data entry system 100 may comprise software accessible through the internet via a browser. Although the memory module 110 is depicted as inside of the user computer 112, the memory module 110 can be located outside of the user computer 112 in other embodiments.

The form analysis module 102 is configured to analyze forms presented to the system 100 to extract information on those forms. The form analysis module 102 may include optical character recognition ("OCR") functions. The marker association module 104 is configured to generate markers/placeholders and to associate the markers/placeholders with fields on the forms. The user interface 106 is configured to enable entry of user information and to display marker—field associations.

While the exemplary system 100 depicted in FIG. 1 includes a form analysis module 102, a marker association module 104 and a user interface 106 running on a single user computer 108, these modules 102, 104, 106 may run on separate computers connected by networks. Examples of such networks that may be utilized for communications between system 100 components include but are not limited to a Local Area Network (LAN), a Wide Area Network (WAN), Metropolitan Area Network (MAN), a wireless network, other suitable networks capable of transmitting data, and a combination one or more or other networks.

Further, various networks, combinations of networks and communication systems, methods and protocols may be utilized.

Figure 2:
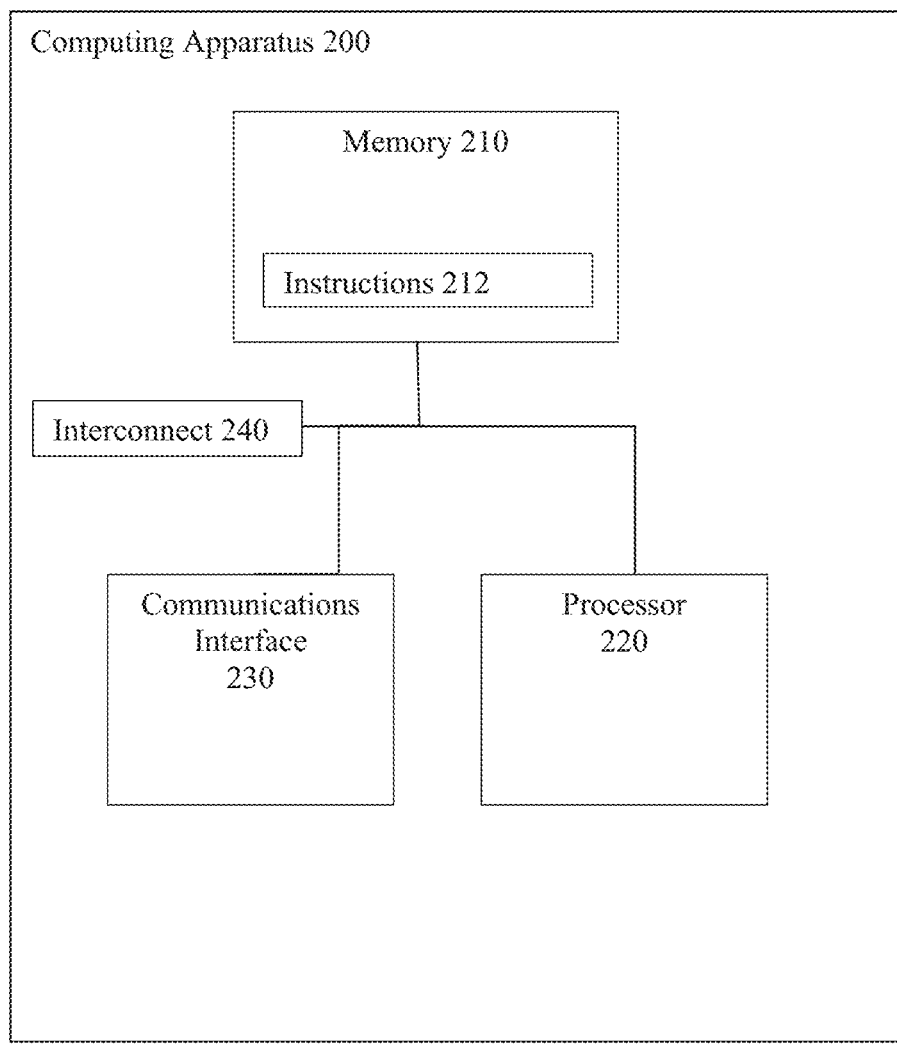
FIG. 2 is a block diagram of a computing apparatus or system in which various embodiments may be implemented or that may be utilized to execute various embodiments.

FIG. 2 generally illustrates certain components of a computing device 200 that may be utilized to execute embodiments and that includes a memory 210, program instructions 212, a processor or controller 220 to execute instructions 212, a network or communications interface 230, e.g., for communications with a network or interconnect 240 between such components. The memory 210 may be or include one or more of cache, RAM, ROM, SRAM, DRAM, RDRAM, EEPROM and other types of volatile or non-volatile memory capable of storing data. The processor unit 820 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 240 may include a system bus, LDT, PCI, ISA, or other types of buses, and the communications or network interface may, for example, be an Ethernet interface, a Frame Relay interface, or other interface. The network interface 230 may be configured to enable a system component to communicate with other system components across a network which may be a wireless or various other networks. It should be noted that one or more components of computing device 200 may be located remotely and accessed via a network. Accordingly, the system configuration provided in FIG. 2 is provided to generally illustrate how embodiments may be configured and implemented.

Computer-implemented method embodiments or certain steps thereof, some of which may be loaded on certain system components, computers or servers, and others of which may be loaded and executed on other system components, computers or servers, may also be embodied in, or readable from, a non-transitory, tangible medium or computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 220 performs steps or executes program instructions 212 within memory 210 and/or embodied on the carrier to implement method embodiments.

Having described various aspects of embodiments of the secure data entry system 100, computer-implemented methods for securely receiving sensitive user data using the systems 100 will now be described.

Figure 3A:
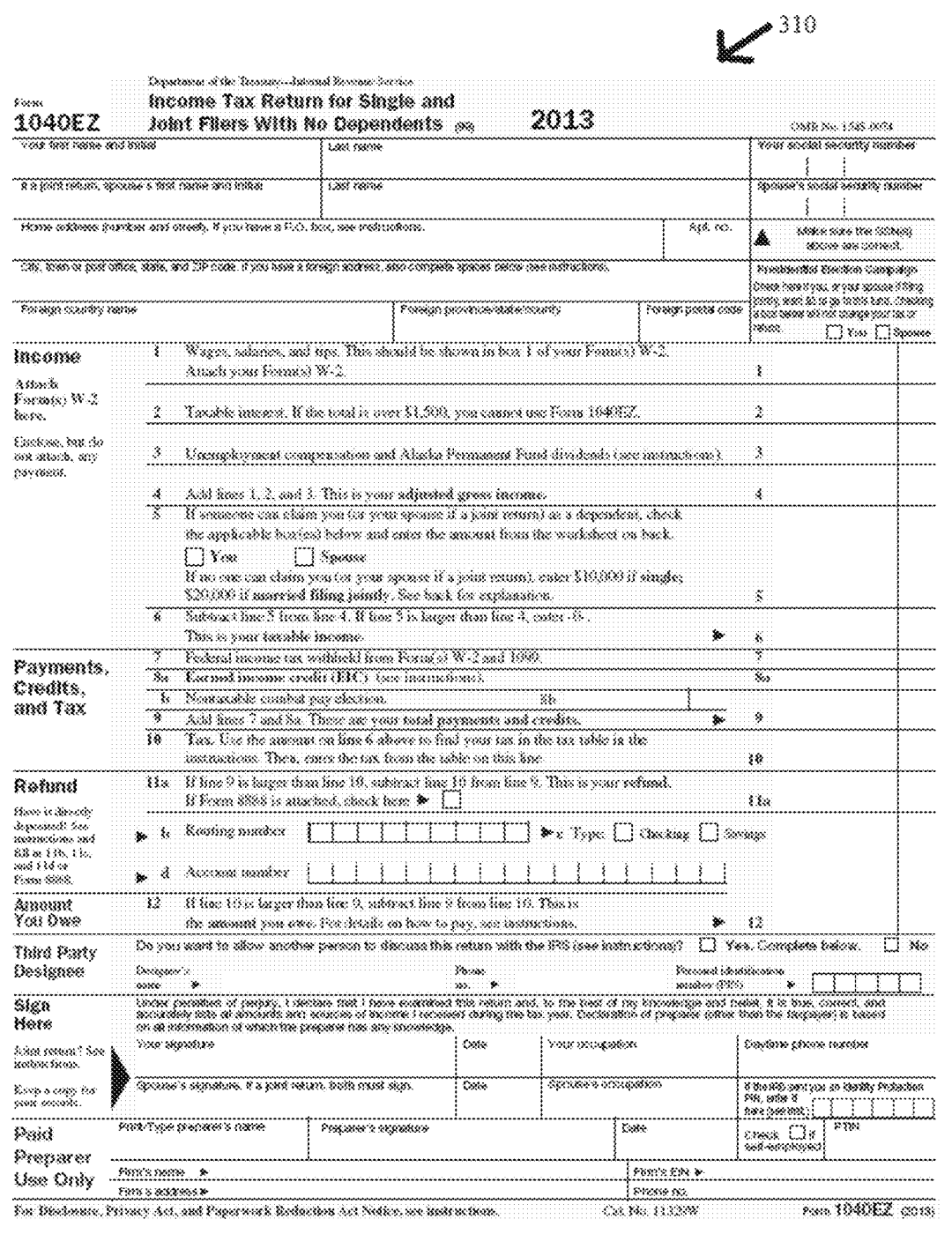
Figure 3B:
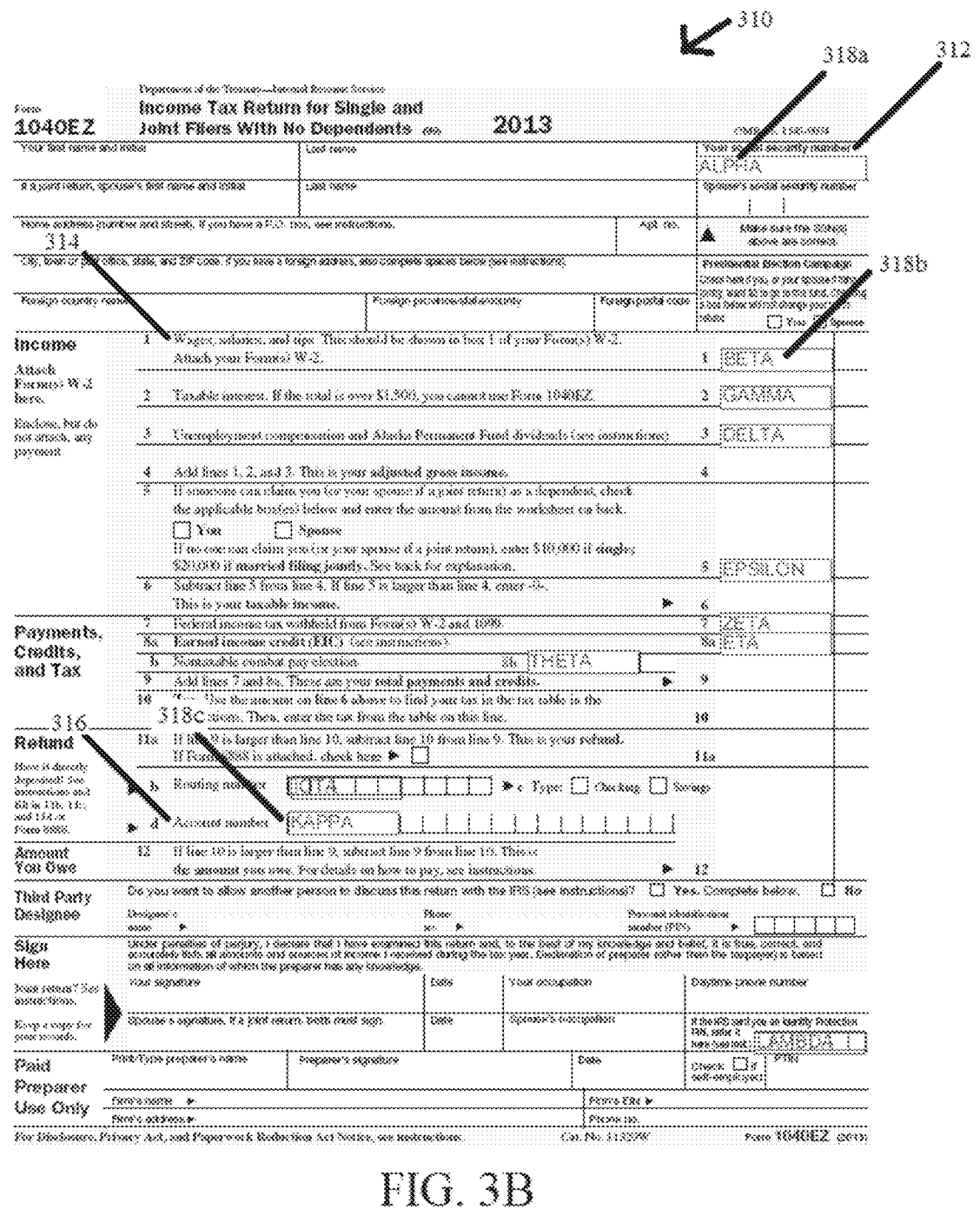
Figure 7:
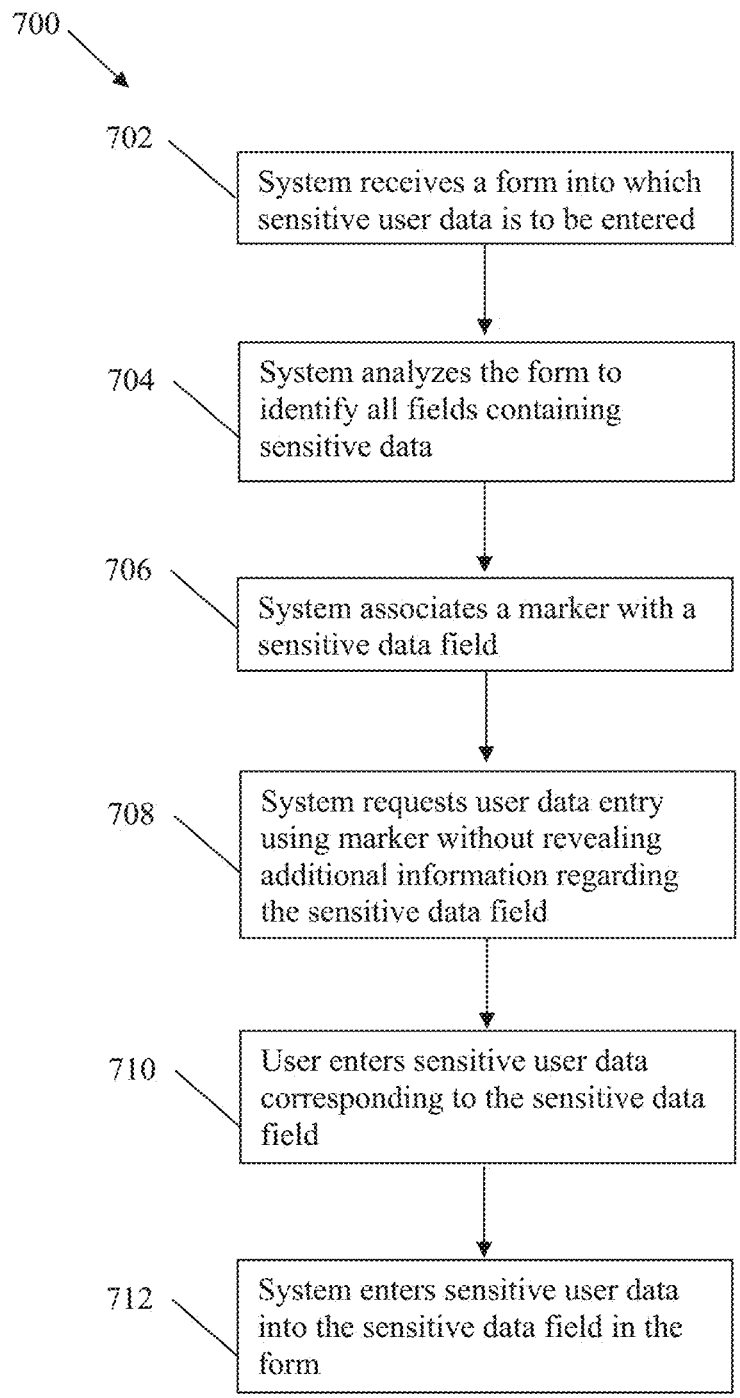
FIGS. 7-10 are various flow diagrams of various embodiments of methods of secure user entry of sensitive data and secure reception of sensitive user data by a computer.

The user data entry systems 100 described herein facilitate secure user entry of sensitive data and secure reception of sensitive user data by a computer. In one embodiment of a method 700 for secure reception of sensitive user data by a computer depicted in FIG. 7, the system 100 first receives a form 310 into which user data is to be entered, at step 702. For instance, the form 310 may be a 1040EZ, as shown in FIGS. 3A and 3B. The form 310 may be electronic, such as a PDF, or hard copy (i.e., paper). If the form 310 is provided in hard copy, the system 100 converts the form 310 into electronic data by scanning and optical character recognition ("OCR"). The form 310 includes many fields containing sensitive data such as Social Security number 312, total wages 314, and bank account number 316. At step 704, the system 100 analyzes the form 310 to identify all fields containing sensitive data 312, 314, 316, etc.

At step 706, the system 100 then associates a marker/placeholder 318a, 318b, 318c (e.g., "Alpha" 318a) with a sensitive data field (e.g., Social Security number 312), as shown in FIG. 3B. At step 708, the markers 318a, 318b, 318c allow the system 100 to refer to sensitive data fields 312, 314, 316 while requesting user data entry, without revealing additional information regarding the sensitive data to be entered in that field 312, 314, 316, such as the identity of that information. For example, instead of asking the user "What is your Social Security number," the system 100 can ask the user "What is the value of Alpha?" In this way, the system 100 allows the user to provide the sensitive information, e.g., Social Security number, while minimizing the likelihood that the sensitive information will be misappropriated, and increasing the security of user data entry. The markers 318a, 318b, 318c provide an additional layer of security, by masking the actual data field. At step 710, a user can freely enter the sensitive user data without being concerned about compromising that data through malicious capture. At step 712, the system 100 enters the sensitive user data (and not the marker 318a) into the sensitive data field in the form 312.

This substitution of a marker 318a for a sensitive data field 312 is compatible with many different types of user interfaces. For instance, a graphical user interface may display the question "What is the value of Alpha?" On the other hand, an audio user interface may generate speech to audibly ask the question "What is the value of Alpha?" In response to either of these questions, the user may transmit the value of Alpha 318a (i.e., Social Security number 312) to the computer using various input devices, including a keyboard, touchpad, speech recognition, and gesture recognition (i.e., head movement, hand movement or eye movement via Google Glass®). While graphical user interfaces are susceptible to malicious capture of sensitive user data by visual spying, audio user interfaces are even more susceptible to eavesdropping. Similarly, speech recognition input devices are also susceptible to eavesdropping. The disclosed systems and methods address this malicious capture problem by using markers 318a, 318b, 318c to mask the identity of requested data.

In some embodiments, the system 100 automatically associates markers 318a, 318b, 318c with each sensitive data field 312, 314, 316. After all of the sensitive data fields 312, 314, 316 have been associated with their respective markers 318a, 318b, 318c, the system 100 can confirm the marker 318a, 318b, 318c—sensitive data field 312, 314, 316 associations with the user. For instance, the system 100 may display the form 310 with markers 318a, 318b, 318c visually linked to respective sensitive data fields 312, 314, 316, as shown in FIG. 3B, and request confirmation of the associations from the user. As with data entry described above, the request for confirmation can be made using various user interfaces, including graphical user interfaces and audio user interfaces. When using an audio user interface, the system 100 would, for instance, ask the user "Please confirm the association between Social Security number and the marker 'Alpha.'" The user can provide confirmation of the association using various input devices, including a keyboard, touchpad, speech recognition, and gesture recognition. Alternatively, the system 100 can simply inform the user of the associations.

The system 100 offers the user the option of identifying additional sensitive data fields for association with markers. After the user has identified an additional sensitive data field, the system 100 automatically associates a marker with the additional sensitive data field. In other embodiments, instead of automatically associating markers with sensitive data fields, the system 100 asks the user to identify sensitive data fields for association with markers. Various user interfaces can be used to facilitate user identification of sensitive data fields. For instance, the system 100 may analyze a form 310 and identify all fields in that form with numbers. The form 310 may then be displayed on the graphical user interface with field numbers visually linked thereto. The user can then identify a sensitive data field by saying, "Associate field '1' with marker 'Alpha.'" Alternatively, the user can read the form 310 and identify sensitive data field by saying, "Associate Social Security number with marker 'Alpha.'" The system 100 will then attempt to identify the Social Security number field and associate it with the marker "Alpha." The system 100 can confirm each such association as described above.

In other embodiments, the system 100 can ask the user to "Please identify field 1." In still other embodiments, the system 100 can ask the user to "Please identify Social Security number." In response to either of these system requests, the user can reply "Alpha."

Figure 4A:
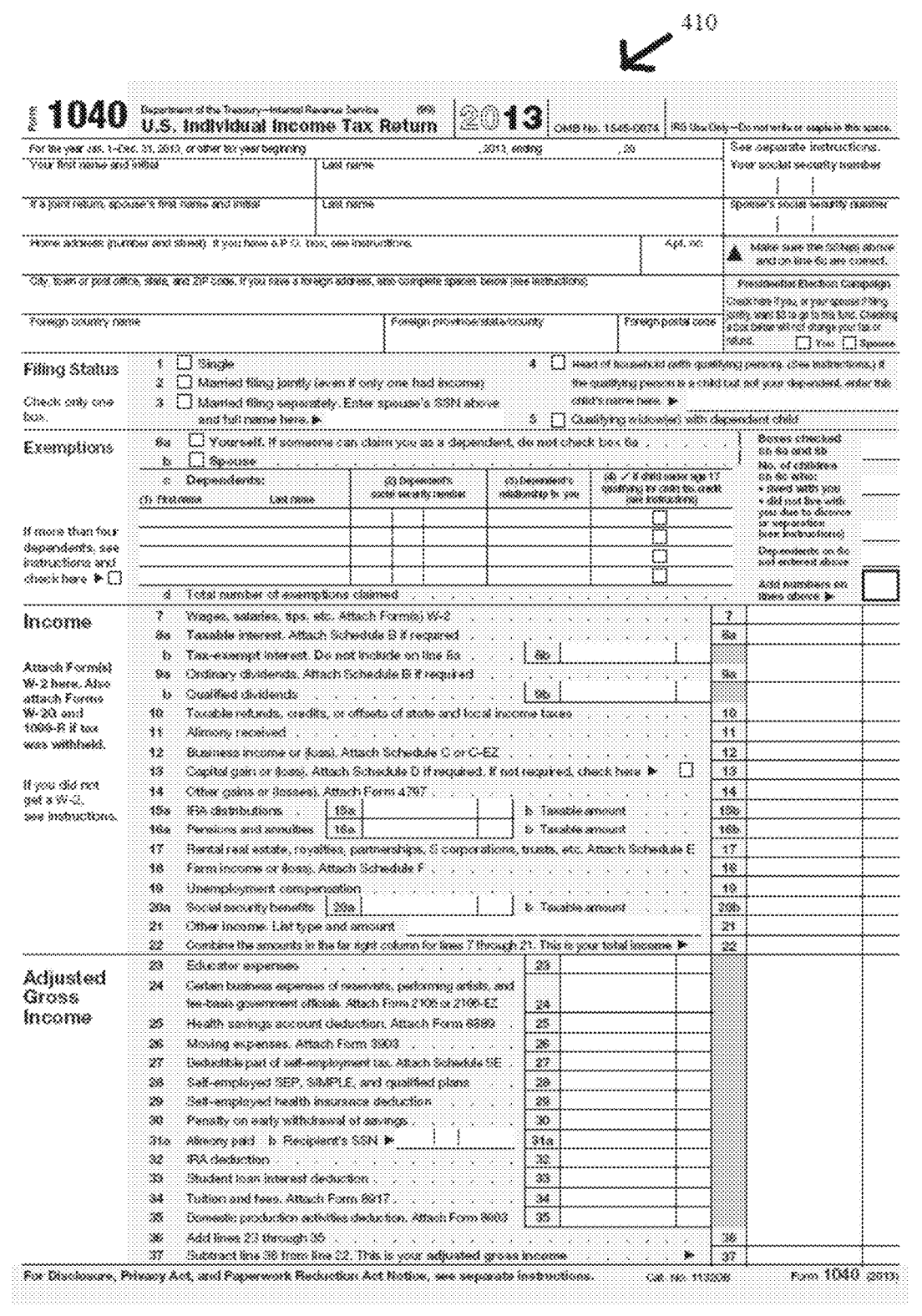
Figure 4B:
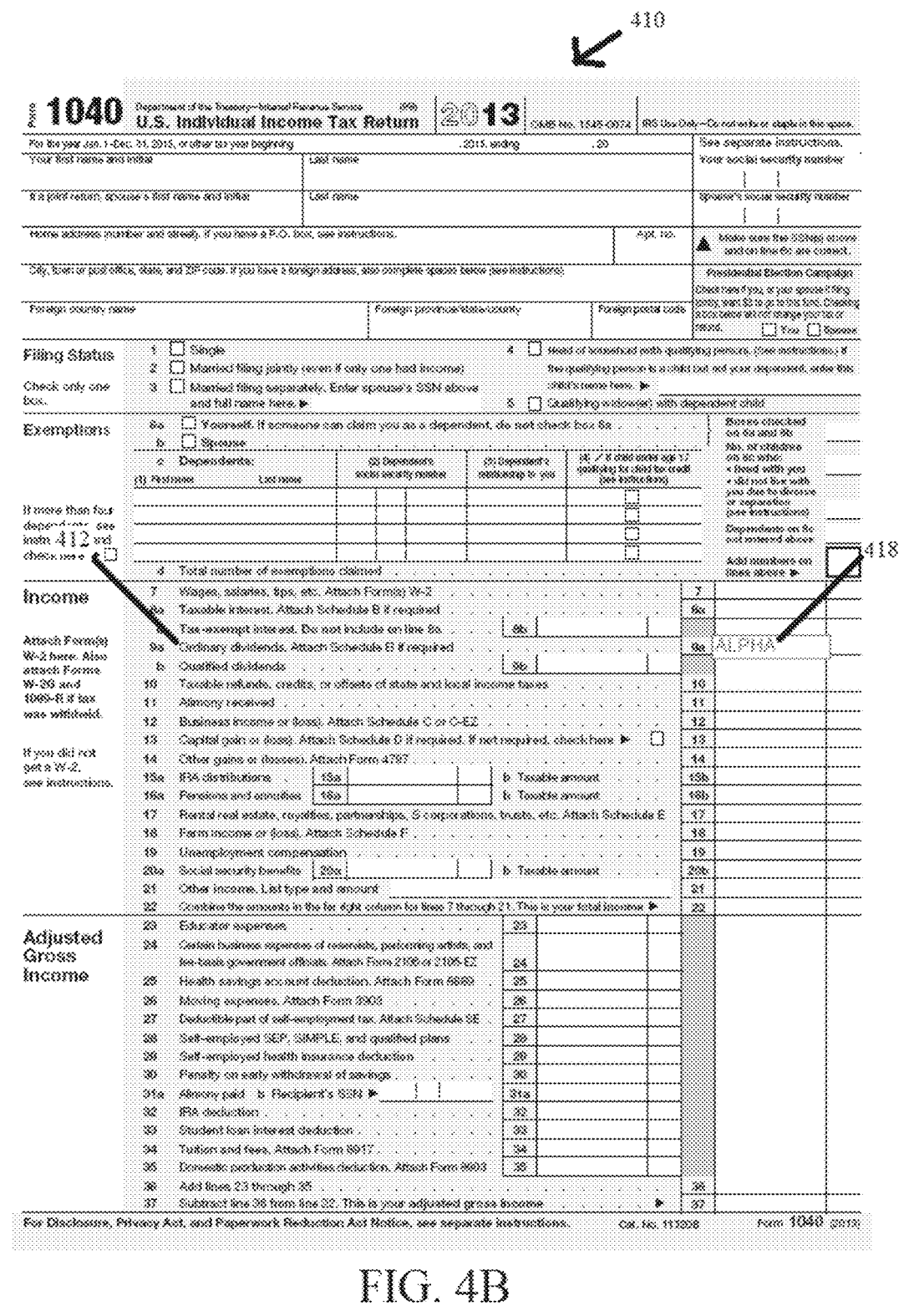
Figure 8:
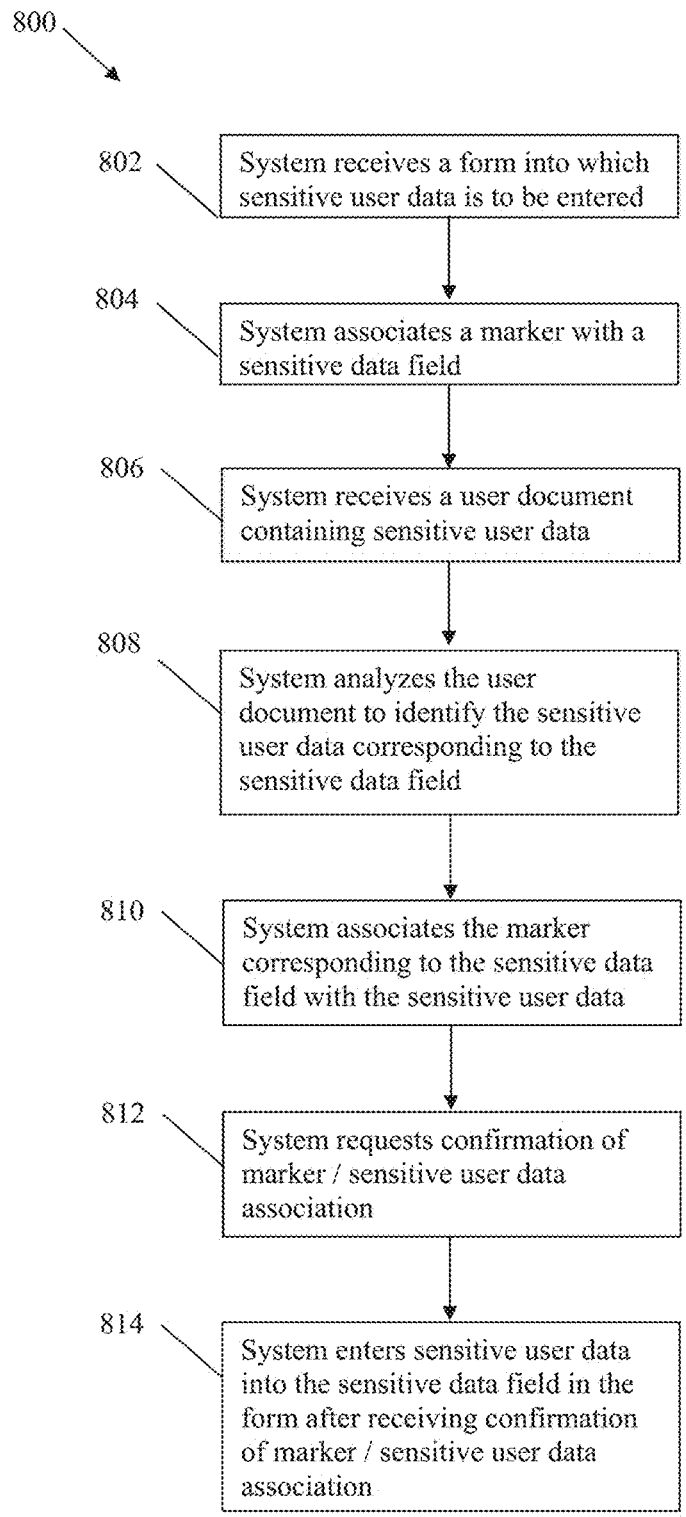

In another embodiment of a method 800 for secure reception of sensitive user data by a computer depicted in FIG. 8, the system 100 is configured to obtain sensitive user data from a user document 450, securely confirm the obtained sensitive data, and enter the confirmed and obtained sensitive user data into a form 410. At step 802, the system 100 first receives a form 410 into which user data is to be entered. For instance, the form may be a 1040, as shown in FIGS. 4A and 4B. The form 410 includes many fields containing sensitive data such as ordinary dividends 412. At step 804, the system 100 then associates a marker/placeholder 418 (e.g., "Alpha") with the sensitive data field (e.g., ordinary dividends 412), as shown in FIG. 4B. The system 100 can optionally request user confirmation of the marker 418—sensitive data field 412 association as described above, minimizing the likelihood that the sensitive information will be misappropriated, and increasing the security of user data entry. Alternatively, the system 100 can simply inform the user of the association.

At step 806, the system 100 receives a user document 450 containing user data 452 corresponding to the sensitive data field 412 (e.g., ordinary dividends). For example, the user document 450 may be a Form 1099, as shown in FIG. 5A. The user document 450 may be in electronic form, such as a PDF, or a hard copy form. If the user document 450 is provided in hard copy, the system 100 converts the user document 450 into electronic data by scanning and optical character recognition ("OCR"). At step 808, the system 100 analyzes the user document 450 to identify the sensitive user data 452 (e.g., ordinary dividends), as shown in FIG. 5A.

At step 810, the system 100 then associates the marker 418 corresponding to the sensitive data field 412 with the sensitive user data 452, as shown in FIG. 5B. At step 812, the system 100 can request user confirmation of the marker 418—sensitive user data 452 association as described above, minimizing the likelihood that the sensitive information will be misappropriated, and increasing the security of user data entry. After the system 100 has received user confirmation of the marker 418—sensitive user data 452 association, the system 100 enters the sensitive user data 452 into the sensitive data field 412 in the form 410 at step 814. In this way, the system 100 can complete a form 410 using sensitive user data 452 obtained from a user document 450, while reducing the likelihood of malicious capture of the sensitive user data 452.

Figure 9:
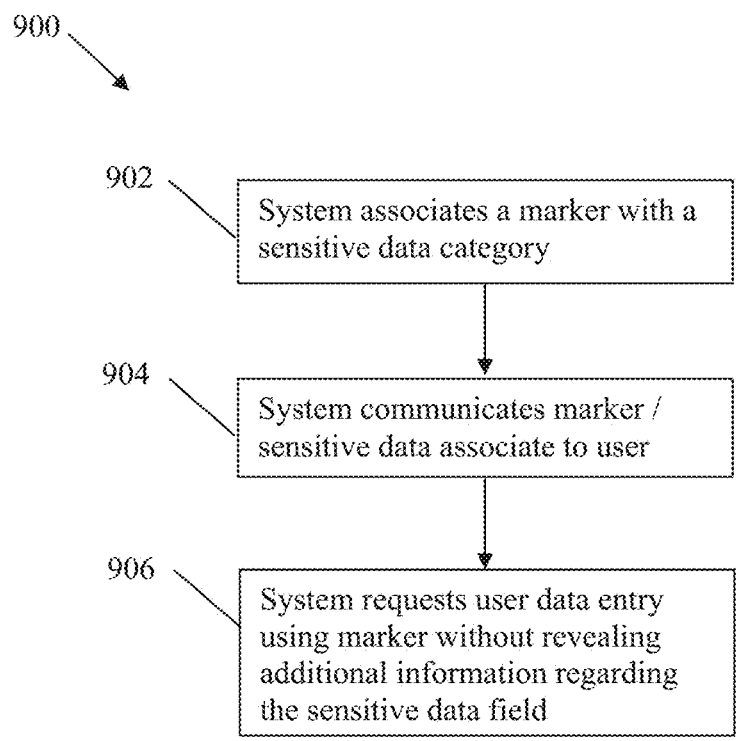
Figure 10:
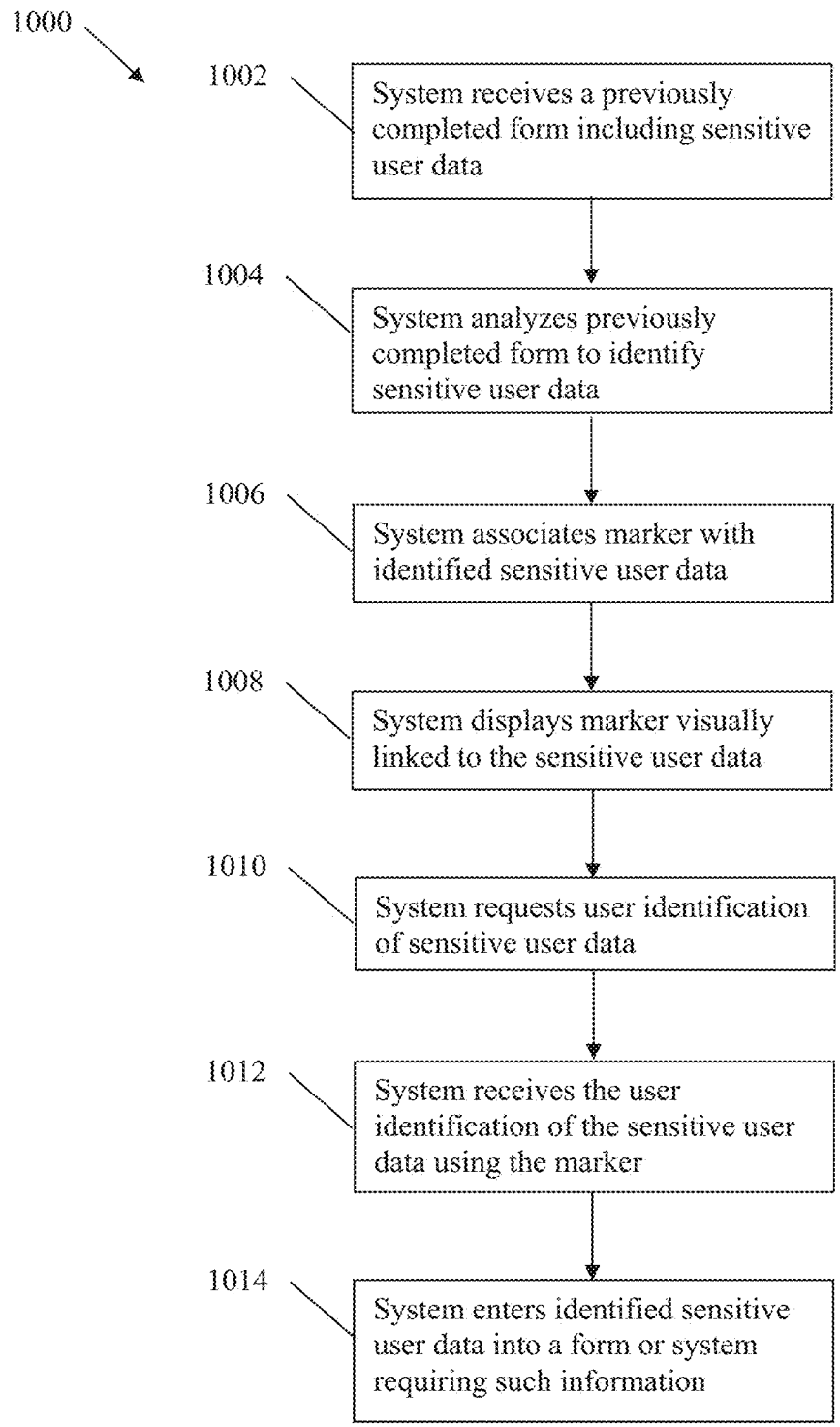
Figure 12:
FIG. 12 depicts a graphical user interface according to various embodiments.

In yet another embodiment of a method 900 for secure reception of sensitive user data by a computer depicted in FIG. 9, the system 100 facilitates secure user entry of sensitive data and secure reception of sensitive user data by a computer without reference to a physical form. For example, a payroll system may require entry of a user's (i.e., a new employee's) sensitive data (i.e., a Social Security number). At step 902, the system 100 associates the sensitive data category 312 with a marker 318 as described above and informs the user of the marker 318—sensitive data category 312 association. At step 904, the system 100 may graphically display or audibly announce to the user, "Social Security number is associated with the marker 'Alpha.'" The system 100 can optionally ask the user to confirm the association as described above.

Either directly after communicating the association to the user, or after communicating a plurality of marker 318—sensitive data category 312 associations to the user, the system 100 uses the marker(s) 318 to facilitate user to entry of sensitive data while minimizing the opportunity for malicious capture of the sensitive data, at step 906. For instance, a graphical user interfaces may display the question "What is the value of Alpha?" Alternatively, an audio user interface may generate speech to ask the question "What is the value of Alpha?" In response to either of these prompts, the user may more securely transmit the value of Alpha 318 (i.e., Social Security number) to the computer using various input devices, including a keyboard, touchpad, speech recognition, and gesture recognition (i.e., via Google Glass®), as described above.

For categories that have not been identified as "sensitive," the system 100 will request user input using the category names. However, the user can override the system 100 and request that a certain data category be identified as "sensitive." For instance, the 100 system may ask the user to "Please provide your telephone number." If the user considers his telephone number to be sensitive data, the user can respond to that request by stating, "Please categorize telephone number as sensitive data." The system 100 will then associate the user's telephone number with a marker 18 and proceed as described above.

Figure 6B:
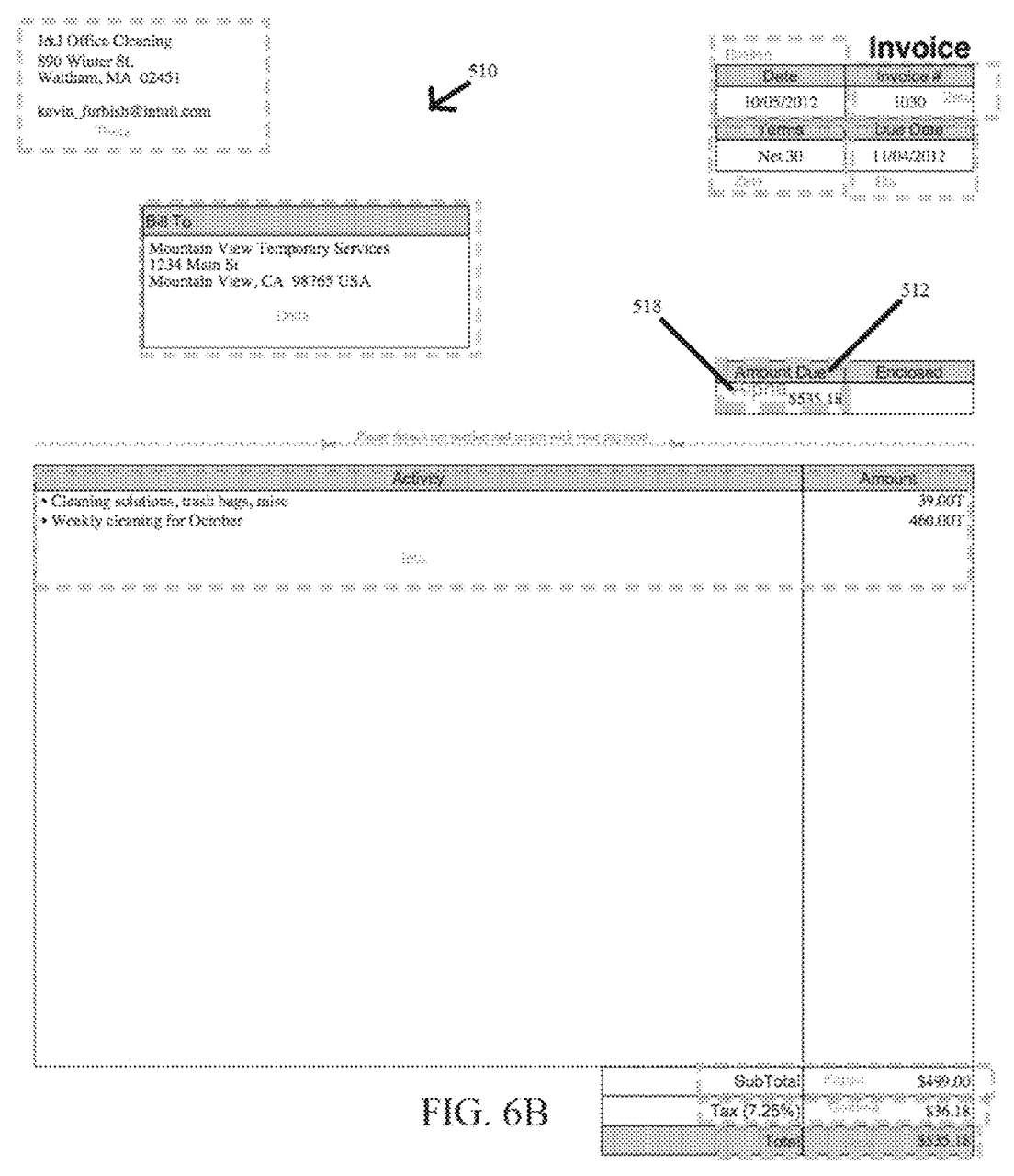

FIGS. 6A and 6B depict still another embodiment where the system 100 is used to securely complete an invoice, perhaps as part of an accounts payable system. FIG. 6A depicts an invoice 510 with the "amount due" field 512 highlighted for association with a marker/placeholder 518, such as "Alpha." FIG. 6B depicts the same invoice 510 with various fields (e.g., amount due 512) associated with respective markers (e.g., "Alpha" 518). The marker association, association confirmation, and user provision of secure user information can be performed as described above.

Figures 11A, 11B:
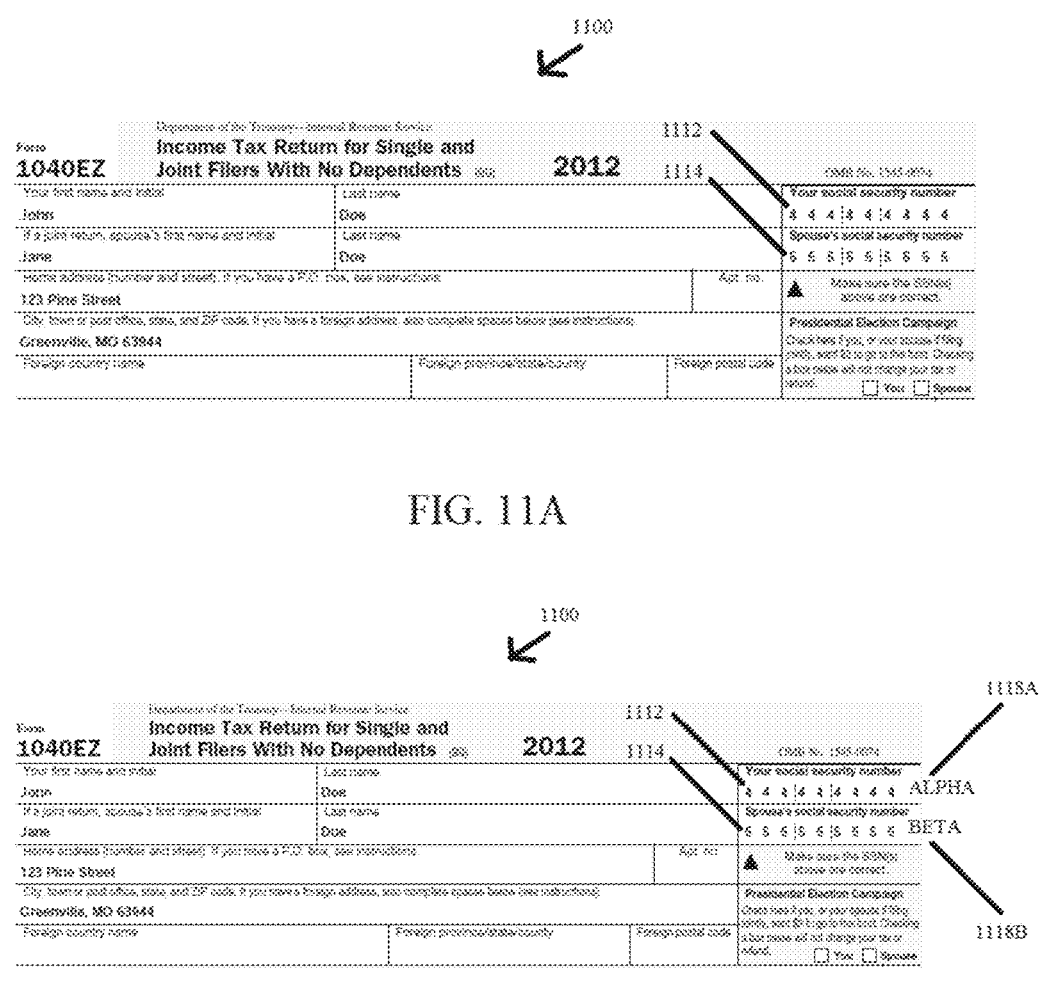

FIGS. 10, 11A, 11B and 12 depict yet another embodiment of a method 1000 for secure reception of sensitive user data by a computer. In the illustrated method 1000, the system 100 is used to confirm computer identification of sensitive user data from a previously completed form. At step 1002, the system 100 receives a previously completed form 1100 that includes sensitive user data. For instance, the form may be a 1040EZ from a previous year, as shown in FIGS. 11A and 11B. The form 1100 includes many fields containing sensitive data such as the tax filer's Social Security number 1112 and the tax filer's spouse's Social Security number 1114.

The previously completed form 1100 may be in electronic form, such as a PDF, or a hard copy form. If the previously completed form 1100 is provided in hard copy, the system 100 converts the completed form 1100 into electronic data by scanning and optical character recognition ("OCR"). At step 1004, the system 100 analyzes the completed form 1100 to identify the sensitive user data 1112, 1114 (e.g., Social Security number and spouse's Social Security number), as shown in FIG. 11A.

At step 1006, the system 100 associates marker/placeholders 1118 (e.g., "Alpha" 1118A and "Beta" 1118B) with each identified sensitive user data (e.g., Social Security number 1112 and spouse's Social Security number 1114), as shown in FIG. 11B. At step 1008, the system 100 displays the previously completed form 1100 with markers 1118A, 1118B visually linked to respective sensitive user data 1112, 1114, as shown in FIG. 11B.

At step 1010, the system 100 requests user identification of sensitive user data using the markers 1118A, 1118B associated with the sensitive user data 1112, 1114. For instance, the system 100 may simultaneously display, on a second screen or on a portion of the screen displaying the markers 1118A, 1118B and sensitive user data 1112, 1114, the question depicted in FIG. 12. Alternatively, an audio user interface may generate speech to audibly ask the question "What is your Social Security number?" In response to either of these questions, the user may input the text "Alpha," thereby minimizing the likelihood that the sensitive user data will be misappropriated, and increasing the security of user data entry. The user may input the text "Alpha" using various input devices, including a keyboard, touchpad, speech recognition, and gesture recognition (i.e., head movement, hand movement or eye movement via Google Glass®) At step 1012, the system 100 receives the user identification of the sensitive user data.

After the system 100 has received user identification of sensitive user data, the system 100 can enters the sensitive user data 1112, 1114 into a form or system requiring such information at step 1014.

While the markers 318, 418, 518 in the embodiments described above are Greek letters, markers can be any identifiers such as text, colors, and glyphs. Further, the markers can be assigned in random order and can be of different types. After a marker 318, 418, 518—sensitive data field association has been made (and optionally confirmed) the marker 318, 418, 518 will be used in all displays and/or speech to facilitate securely receiving sensitive user data. While specific phrases have been provided as examples for user interfaces, the system can be configured to recognize a variety of phrases having the same meanings.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

While multiple embodiments and variations of aspects of the invention have been disclosed herein, such disclosure is provided for purposes of illustration only. Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process as well as performed sequentially. Thus, the methods shown in various flow diagrams are not intended to be limited to a particular sequential order, particularly in instances in which certain steps may or may not be performed. Accordingly, embodiments are intended to exemplify alternatives, modifications, and equivalents that may fall within the scope of the claims.

What is claimed is:

1. A computer-implemented method for securely receiving user data, the method comprising:
a computer associating respective unique markers with respective sensitive data fields in a form, wherein each unique marker refers to a sensitive data field without revealing a type or a category of the sensitive data field;
the computer generating respective questions including the respective unique markers to facilitate secure entry of respective user data in the respective sensitive data fields; and
the computer entering the respective user data in the respective sensitive data fields in the form.

2. The method of claim 1, further comprising the computer identifying the respective sensitive data fields in the form.

3. The method of claim 2, further comprising the computer associating the respective unique markers with the respective sensitive data fields without user intervention to generate respective unique marker—sensitive data field associations.

4. The method of claim 2, further comprising the computer receiving user confirmation of the respective unique marker—sensitive data field associations.

5. The method of claim 4, further comprising the computer displaying a user interface configured to receive user confirmation of the respective unique marker—sensitive data field associations.

6. The method of claim 2, further comprising the computer analyzing the form to identify the respective sensitive data fields therein.

7. The method of claim 1, further comprising the computer displaying a user interface configured to receive the respective user data.

8. The method of claim 7, wherein the user interface comprises a graphical user interface.

9. The method of claim 8, wherein the user interface further comprises a speech recognition interface.

10. The method of claim 8, wherein the user interface further comprises a gesture recognition interface.

11. The method of claim 7, wherein the user interface comprises an audio user interface.

12. The method of claim 11, wherein the user interface further comprises a speech recognition interface.

13. The method of claim 11, wherein the user interface further comprises a gesture recognition interface.

14. The method of claim 1, wherein the form is generated by a computerized tax return preparation program in real time during preparation of an electronic tax return.

15. The method of claim 1, further comprising the computer receiving the respective user data associated with respective unique markers.

16. A computer-implemented method for securely receiving user data, the method comprising:
a computer associating respective unique markers with respective sensitive data categories, wherein each unique marker refers to a sensitive data category without revealing a type or a category of the sensitive data category; and the computer generating respective questions including the respective unique markers to facilitate secure entry of respective user data in the respective sensitive data categories.

17. The method of claim 16, further comprising the computer associating the respective unique markers with the respective sensitive data categories without user intervention to generate respective unique marker—sensitive data category associations.

18. The method of claim 16, further comprising the computer receiving user confirmation of the respective unique marker—sensitive data category associations.

19. The method of claim 18, further comprising the computer displaying a user interface configured to receive user confirmation of the respective unique marker—sensitive data category associations.

20. The method of claim 16, further comprising the computer displaying a user interface configured to receive the respective user data.

21. The method of claim 20, wherein the user interface comprises a graphical user interface.

22. The method of claim 21, wherein the user interface further comprises a speech recognition interface.

23. The method of claim 21, wherein the user interface further comprises a gesture recognition interface.

24. The method of claim 20, wherein the user interface comprises an audio user interface.

25. The method of claim 24, wherein the user interface further comprises a speech recognition interface.

26. The method of claim 24, wherein the user interface further comprises a gesture recognition interface.

27. The method of claim 16, further comprising the computer receiving input identifying the respective sensitive data categories before associating the respective unique markers therewith.

28. A computer-implemented method for securely entering user data into a form, the method comprising:
 a computer associating respective unique markers with respective sensitive data field in a form, wherein each unique marker is configured to refer to a sensitive data field without revealing a type or a category of the sensitive data field;
 the computer receiving user confirmation of respective unique marker—sensitive data field associations;
 the computer analyzing a user document to identify respective user data corresponding to the respective sensitive data fields;
 the computer receiving user confirmation of respective user data—unique marker associations; and
 the computer entering the respective user data in the respective sensitive data fields in the form after receiving user confirmation of the respective unique marker—sensitive data field associations and the respective user data—unique marker associations.

29. The method of claim 28, further comprising the computer identifying the respective sensitive data fields in the form.

30. The method of claim 28, further comprising the computer associating the respective unique markers with the respective sensitive data fields without user intervention.

31. The method of claim 28, further comprising the computer displaying a user interface configured to receive user confirmation of the respective unique marker—sensitive data field associations.

32. The method of claim 28, further comprising the computer displaying a user interface configured to receive user confirmation of the respective user data—unique marker associations.

33. The method of claim 28, wherein the form is generated by a computerized tax return preparation program in real time during preparation of an electronic tax return.

34. The method of claim 28, further comprising the computer receiving the respective user data associated with respective unique markers.

35. A computer-implemented method for securely receiving user data, the method comprising:
 a computer analyzing a previously completed form to identify respective sensitive user data;
 the computer associating respective unique markers with the respective sensitive user data, wherein the each unique marker refers to a sensitive user datum without revealing a type or a category of the sensitive user datum; and
 the computer using the respective unique markers to facilitate secure entry of the respective sensitive user data.

36. The method of claim 35, wherein the computer using the respective unique markers to facilitate secure entry of the respective sensitive user data comprises
 the computer displaying the respective unique markers visually linked to the respective sensitive user data,
 the computer requesting user identification of the respective sensitive user data, and
 the computer receiving user identification of the respective sensitive user data.

37. A computer program product comprising a non-transitory computer readable storage medium embodying one or more instructions executable by a computer to perform a process for securely receiving user data, the process comprising a computer associating respective unique markers with respective sensitive data fields in a form, wherein each unique marker refers to a sensitive data field without revealing a type or a category of the sensitive data field, the computer generating respective questions including the respective unique markers to facilitate secure entry of respective user data in the respective sensitive data fields, and the computer entering the respective user data in the respective sensitive data fields in the form.

38. A computer program product comprising a non-transitory computer readable storage medium embodying one or more instructions executable by a computer to perform a process for securely receiving user data, the process comprising a computer associating respective unique markers with respective sensitive data categories, wherein each unique marker refers to a sensitive data category without revealing a type or a category of the sensitive data category, and the computer generating respective questions including the respective unique markers to facilitate secure entry of respective user data in the respective sensitive data categories.

39. A computer program product comprising a non-transitory computer readable storage medium embodying one or more instructions executable by a computer to perform a process for securely entering user data into a form, the process comprising a computer associating respective unique markers with respective sensitive data fields in a form, wherein each unique marker refers to a sensitive data field without revealing a type or a category of the sensitive data field, the computer receiving user confirmation of respective unique marker—sensitive data field associations, the computer analyzing a user document to identify respective user data corresponding to the respective sensitive data fields, the computer receiving user confirmation of respective user data—unique marker associations, and the computer entering the respective user data in the respective sensitive data field in the form after receiving user confirmation of the respective unique marker—sensitive data field associations and the respective user data—unique marker associations.

40. A computer program product comprising a non-transitory computer readable storage medium embodying one or more instructions executable by a computer to perform a process for securely receiving user data, the process comprising a computer analyzing a previously completed form to identify respective sensitive user data, the computer associating respective unique markers with the respective sensitive user data, wherein each unique marker refers to a sensitive user datum without revealing a type or a category of the sensitive user datum, and the computer using the respective unique markers to facilitate secure entry of the respective sensitive user data.

* * * * *